(12) United States Patent
Weng et al.

(10) Patent No.: US 11,768,346 B2
(45) Date of Patent: Sep. 26, 2023

(54) OPTICAL MECHANISM

(71) Applicant: TDK TAIWAN CORP., Taoyuan (TW)

(72) Inventors: Chih-Wei Weng, Taoyuan (TW); Shao-Kuang Huang, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 198 days.

(21) Appl. No.: 17/194,822

(22) Filed: Mar. 8, 2021

(65) Prior Publication Data

US 2021/0191070 A1    Jun. 24, 2021

Related U.S. Application Data

(63) Continuation of application No. 16/028,541, filed on Jul. 6, 2018, now Pat. No. 10,976,516.

(60) Provisional application No. 62/529,806, filed on Jul. 7, 2017.

(30) Foreign Application Priority Data

Jul. 2, 2018    (CN) .................. 201810708058.X

(51) Int. Cl.
| | |
|---|---|
| *G02B 7/09* | (2021.01) |
| *G02B 13/00* | (2006.01) |
| *H02K 41/035* | (2006.01) |
| *G03B 3/10* | (2021.01) |
| *G03B 13/36* | (2021.01) |
| *H02K 11/215* | (2016.01) |

(52) U.S. Cl.
CPC ............. *G02B 7/09* (2013.01); *G02B 13/009* (2013.01); *G03B 3/10* (2013.01); *G03B 13/36* (2013.01); *H02K 41/0356* (2013.01); *G03B 2205/0069* (2013.01); *H02K 11/215* (2016.01); *H02K 2203/03* (2013.01)

(58) Field of Classification Search
CPC ..... G02B 7/09; G02B 13/009; H02K 41/0356
USPC ........................................... 359/824
See application file for complete search history.

(56) References Cited

U.S. PATENT DOCUMENTS

| | | | |
|---|---|---|---|
| 6,549,346 B2 * | 4/2003 | Wada ................. | G02B 7/025 |
| | | | 359/824 |
| 2016/0154204 A1 * | 6/2016 | Lim ................... | G02B 27/646 |
| | | | 359/557 |

FOREIGN PATENT DOCUMENTS

| | | |
|---|---|---|
| CN | 1349221 A | 5/2002 |
| CN | 101726826 A | 6/2010 |
| CN | 104820271 A | 8/2015 |
| CN | 105652557 A | 6/2016 |

OTHER PUBLICATIONS

Office Action dated May 25, 2021 in CN Application No. 101810708058.X, 11 pages.

* cited by examiner

*Primary Examiner* — James R Greece
(74) *Attorney, Agent, or Firm* — MUNCY, GEISSLER, OLDS & LOWE, P.C.

(57) ABSTRACT

An optical mechanism is provided, including a housing, a holder, a lens received in the holder, a driving assembly, and a base connected to the housing. The holder is movably disposed in the housing, and the lens has a first surface exposed to a first side of the holder and facing a first inner sidewall surface of the housing. The driving assembly is disposed in the housing for driving the holder and the lens to move relative to the housing.

20 Claims, 10 Drawing Sheets

OPTICAL MECHANISM

CROSS REFERENCE TO RELATED APPLICATIONS

This application is a Continuation of pending U.S. patent application Ser. No. 16/028,541, filed Jul. 6, 2018 and entitled "OPTICAL MECHANISM", which claims the benefit of U.S. Provisional Application No. 62/529,806, filed Jul. 7, 2017, and China Patent Application No. 201810708058.X filed on Jul. 2, 2018, the entirety of which is/are incorporated by reference herein.

BACKGROUND OF THE INVENTION

Field of the Invention

The application relates in general to an optical mechanism, and in particular, to an optical mechanism having an optical lens.

Description of the Related Art

As technology has advanced, a lot of electronic devices (such as cameras and smartphones) have incorporated the functionality of taking photographs and recording video. These electronic devices have become more commonplace, and have been developed to be more convenient and thin.

In some electronic devices, several coils and magnets corresponding thereto may be provided in a driving mechanism for adjusting the focus of a camera lens. However, miniaturization of the electronic devices may cause there to be inadequate space to accommodate the driving mechanism, and addressing the aforementioned problems in mechanism design has become a challenge.

BRIEF SUMMARY OF INVENTION

In view of the aforementioned problems, the object of the invention is to provide an optical mechanism that includes a housing, a holder, a lens received in the holder, a driving assembly, and a base connected to the housing. The holder is movably disposed in the housing, and the lens has a first surface exposed to a first side of the holder and facing a first inner sidewall surface of the housing. The driving assembly is disposed in the housing for driving the holder and the lens to move relative to the housing.

In some embodiments, the lens further has a second surface exposed to a second side of the holder and facing a second inner sidewall surface of the housing, and the second side is opposite to the first side.

In some embodiments, the driving assembly has a coil and a magnetic unit, the magnetic unit is affixed to the housing, and the coil is affixed to a third side of the holder, wherein the third side is adjacent to the first and second sides.

In some embodiments, the first surface protrudes from the first side of the holder.

In some embodiments, the first surface is a flat surface.

In some embodiments, the first surface is aligned with the holder.

In some embodiments, the optical mechanism further comprises an anti-reflection layer formed on the first inner sidewall surface.

In some embodiments, the optical mechanism further comprises an ink layer disposed on the first surface.

In some embodiments, the driving assembly has a coil and a magnetic unit, the magnetic unit is affixed to the housing, and the coil is affixed to the holder and covers at least a part of the first surface.

In some embodiments, when the holder moves to a limit position relative to the housing, the lens contacts the housing or the base to restrict the holder in the limit position.

An embodiment of the invention further provides an optical mechanism that includes a housing, a holder movably disposed in the housing, a lens disposed in the holder, a driving assembly, and a base connected to the housing. The lens has a first surface, a second surface, a third surface, and a fourth surface, wherein the first surface is parallel to the third surface, and the second surface is parallel to the fourth surface. The driving assembly is disposed in the housing for driving the holder and the lens to move relative to the housing.

In some embodiments, the first and second surfaces are respectively exposed to the first and second sides of the holder, and the first and second surfaces respectively face a first inner sidewall surface and a second inner sidewall surface of the housing, wherein the second side is opposite to the first side.

In some embodiments, the optical mechanism further comprises an anti-reflection layer formed on the first inner sidewall surface.

In some embodiments, the optical mechanism further comprises an ink layer disposed on the first surface.

In some embodiments, the third surface is exposed to a third side of the holder, and the third side is adjacent to the first and second sides.

In some embodiments, the fourth surface is exposed to a fourth side of the holder, and the fourth side is opposite to the third side.

In some embodiments, the third and fourth surfaces are perpendicular to the first and second surfaces.

In some embodiments, area of the third surface is less than that of the first surface.

In some embodiments, the driving assembly has a coil and a magnetic unit, the magnetic unit is affixed to the housing, and the coil is affixed to the holder and covers at least a part of the first surface.

In some embodiments, the optical mechanism further comprises a position sensing element disposed on the first side of the holder to detect the displacement of the holder relative to the housing.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
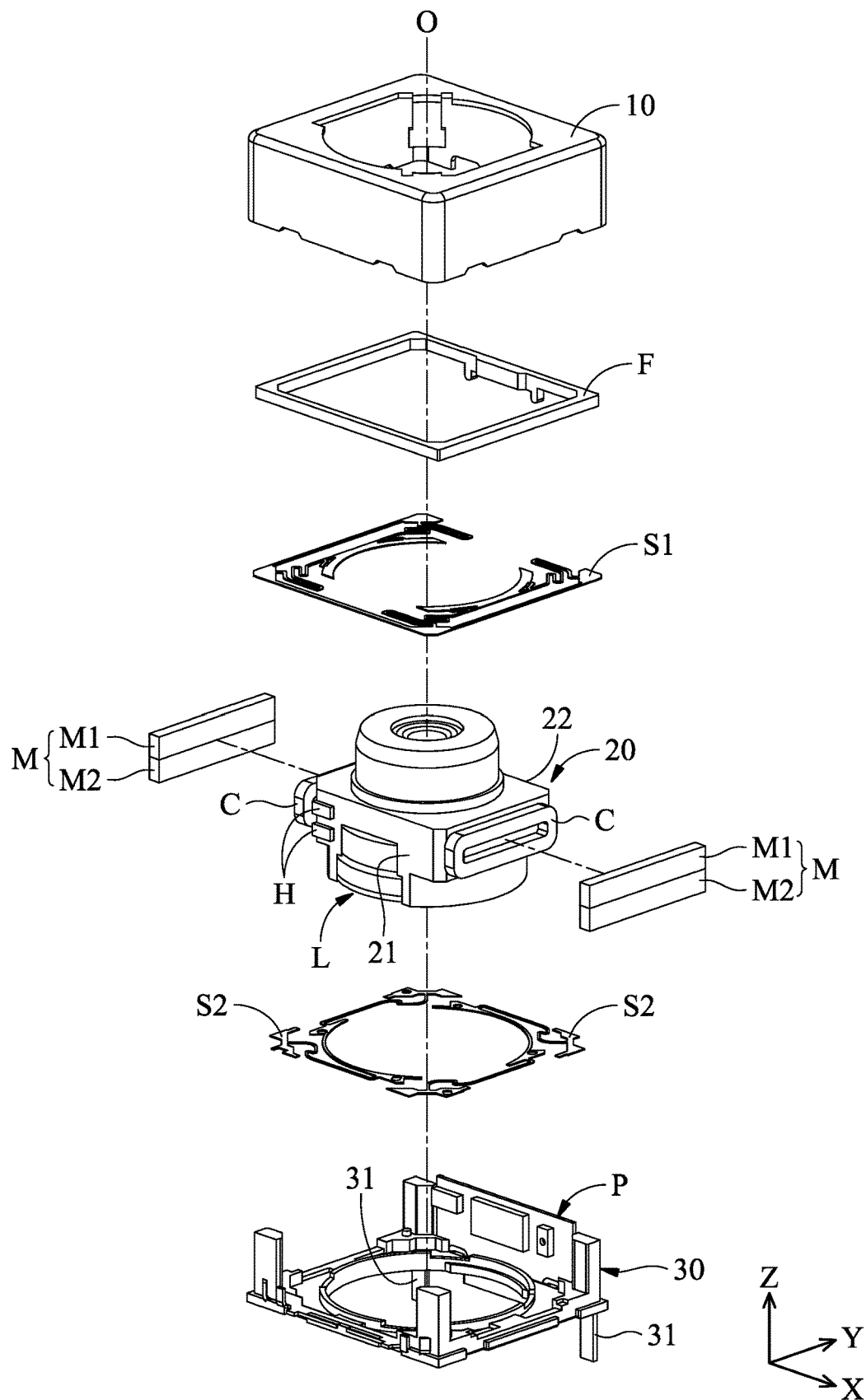
FIG. 1 shows an exploded view of an optical mechanism according to an embodiment of the invention.
Figure 2:
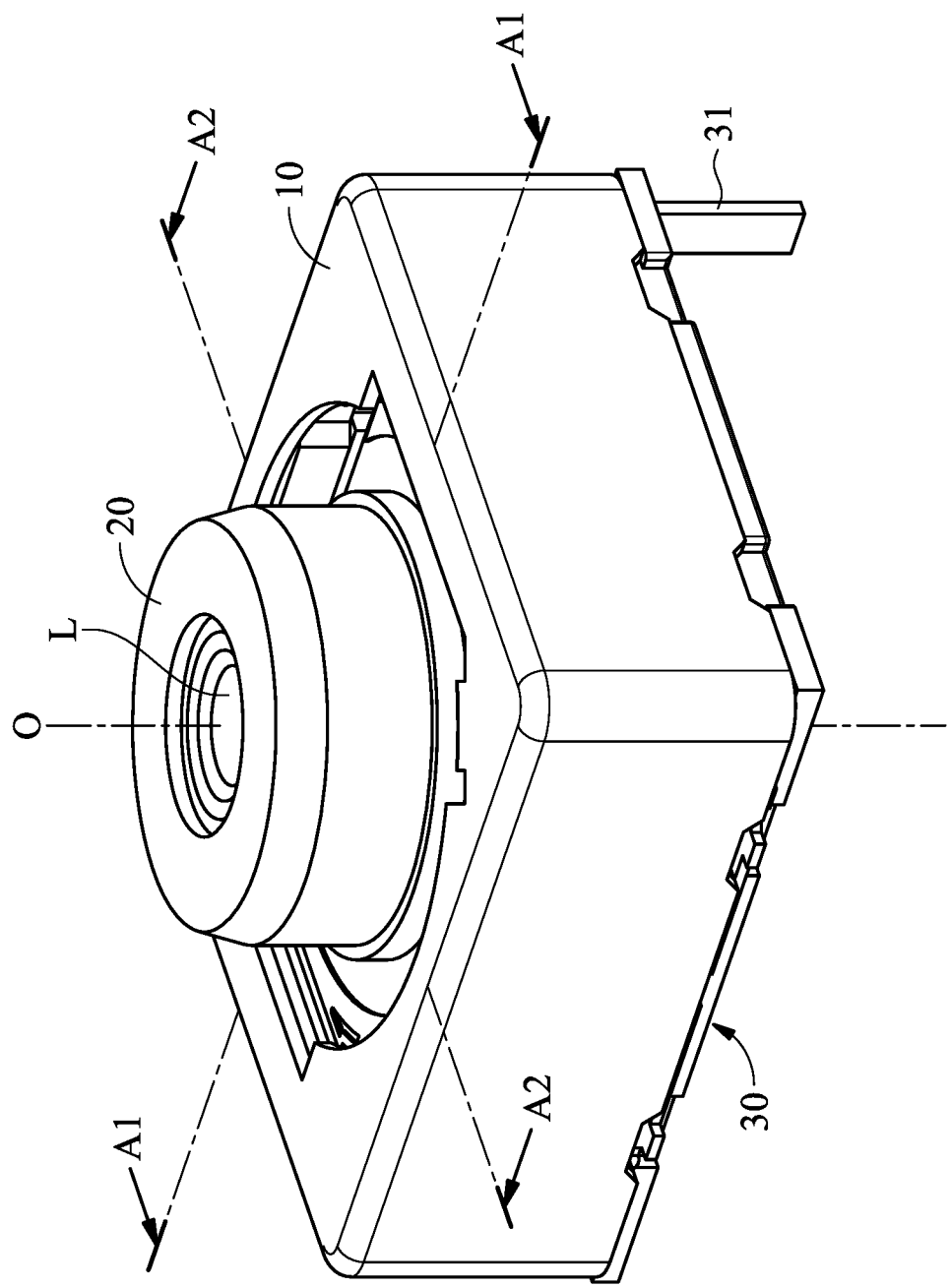
FIG. 2 shows a perspective diagram of the optical mechanism in FIG. 1 after assembly.
Figure 3:
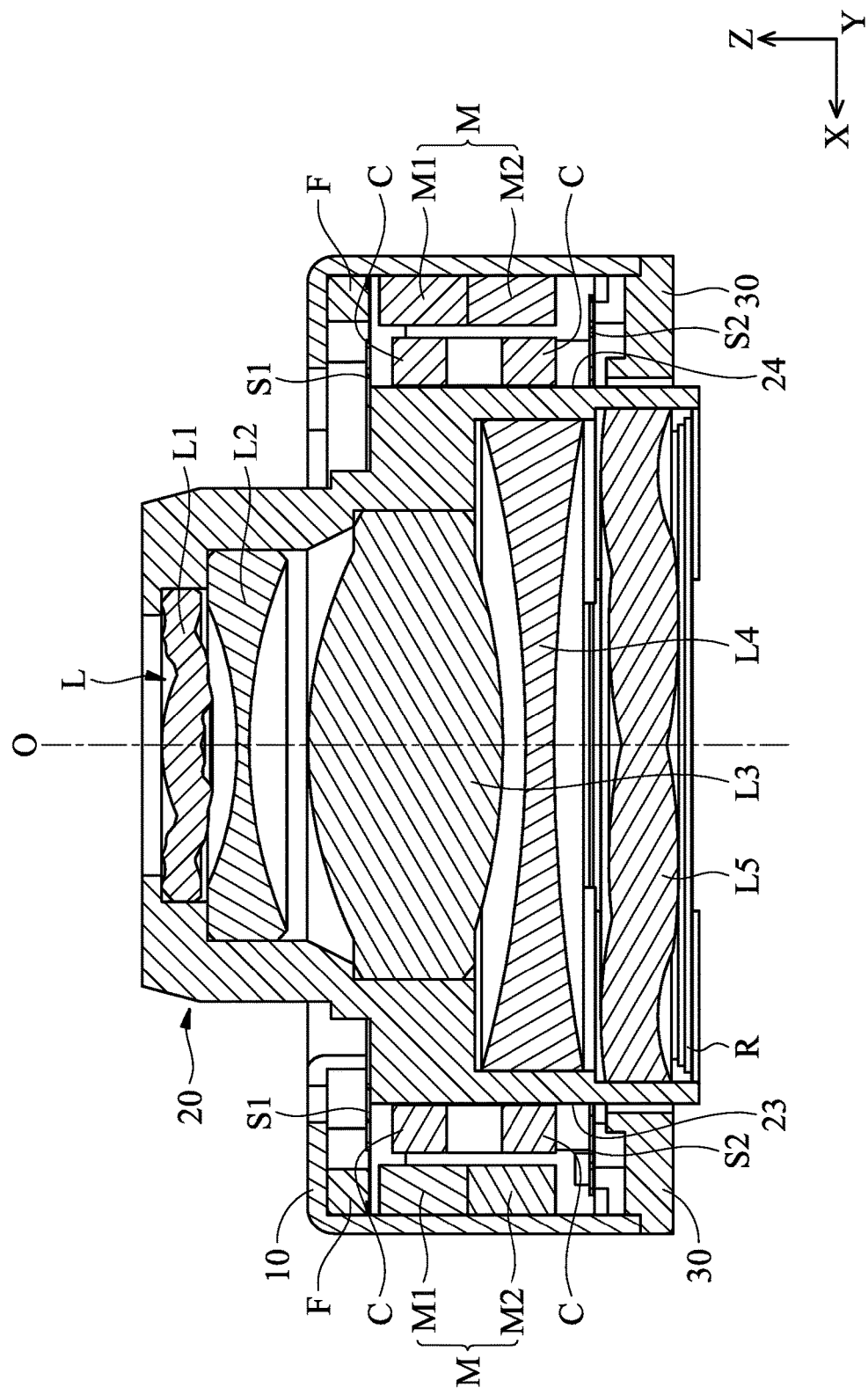
FIG. 3 shows a cross-sectional view taken along line A1-A1 in FIG. 2.
Figure 4:
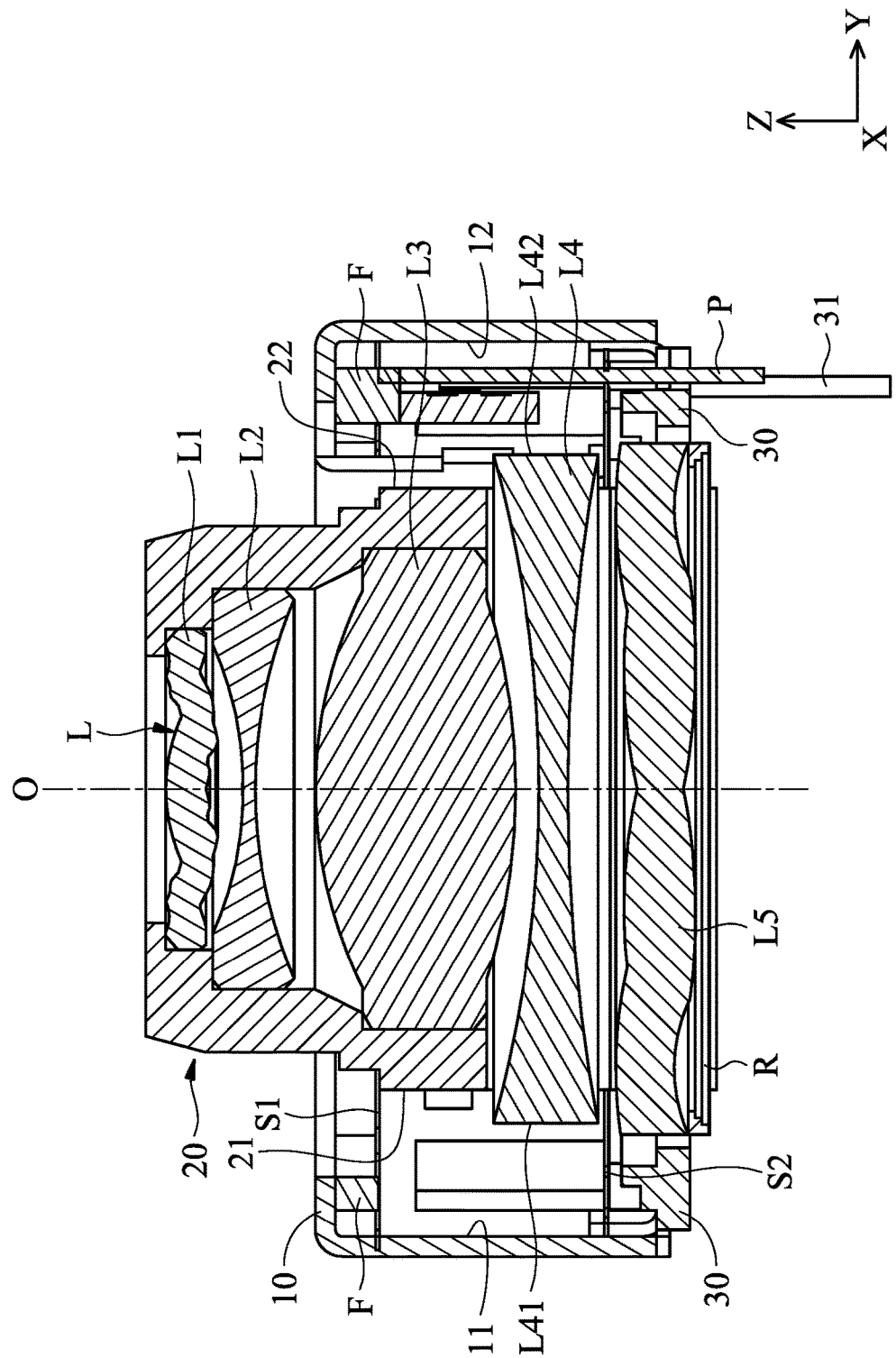
FIG. 4 shows a cross-sectional view taken along line A2-A2 in FIG. 2.
Figure 5:
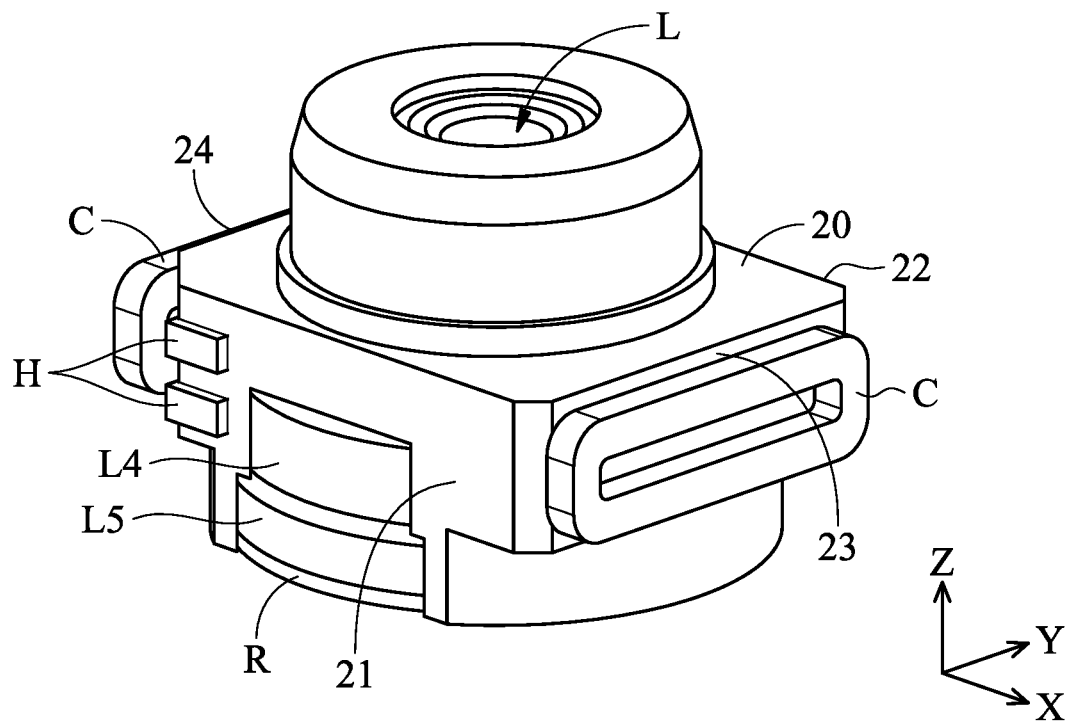
FIGS. 5-8 are perspective diagrams from different viewing angles showing the holder 20, the lens unit L, and the coils C of the optical mechanism in FIG. 1 after assembly.
Figure 6:
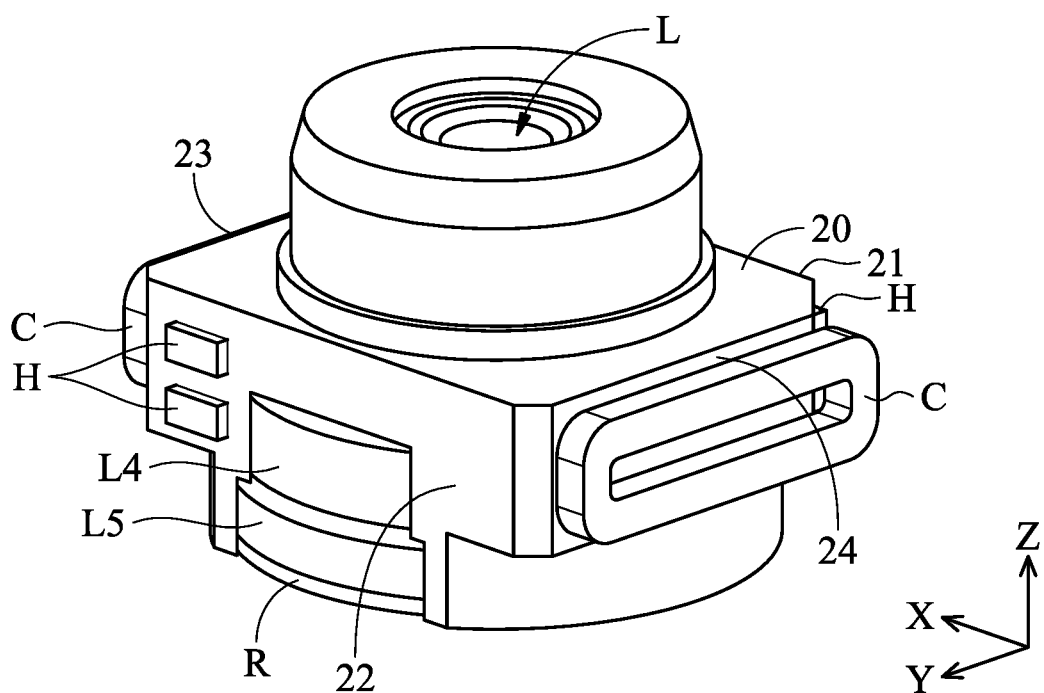
Figure 7:
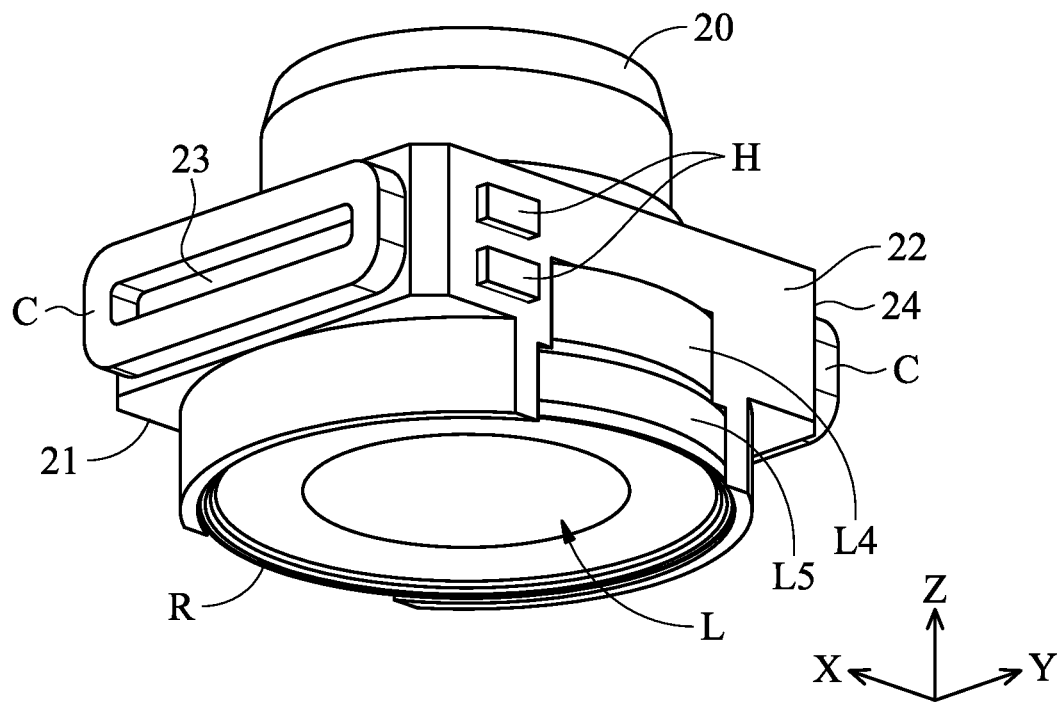
Figure 8:
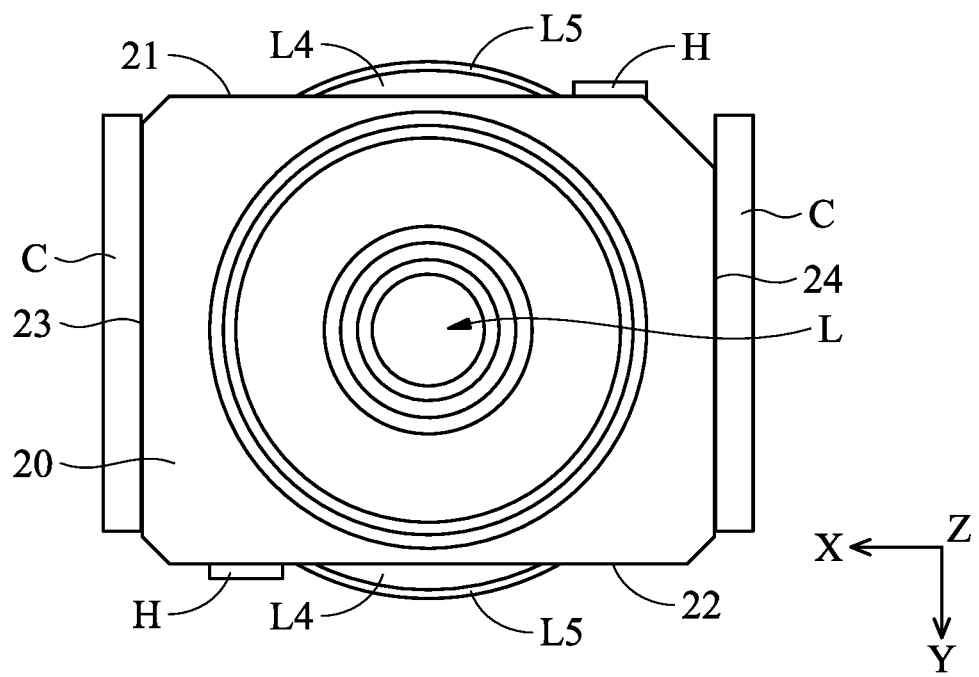

Referring to FIGS. 1-4, wherein FIG. 1 shows an exploded view of an optical mechanism according to an embodiment of the invention, FIG. 2 shows a perspective diagram of the optical mechanism in FIG. 1 after assembly, FIG. 3 shows a cross-sectional view taken along line A1-A1 in FIG. 2, and FIG. 4 shows a cross-sectional view taken along line A2-A2 in FIG. 2.

As shown in FIGS. 1-3, the optical mechanism in this embodiment primarily comprises a housing 10, a frame F, an upper spring S1, a hollow holder 20, a lens unit L, at least a coil C, at least a magnetic unit M, two lower springs S2, a base 30, and a circuit board P. The holder 20 has a quadrilateral structure for holding the lens unit L, and the circuit board P can be affixed to the base 30 or the housing 10.

The optical mechanism may be disposed in a portable electronic device (e.g. cell phone or tablet computer). In this embodiment, the optical mechanism is electrically connected to an external circuit unit (not shown) via two conductive pins 31 on the base 30 for adjusting the position of the holder 20 and the optical unit L. Therefore, light can be guided through the optical unit L and focused onto a photosensitive element (not shown) to generate a clear image, so that auto-focus and auto-zoom control of the optical unit L can be achieved. In an exemplary embodiment, the optical mechanism may comprise a Voice Coil Motor (VCM).

The optical unit L may include one or several optical lenses, wherein some of the lenses protrude from the holder 20 and are exposed to a first side 21 or/and a second side 22 of the holder 20. Additionally, two oval-shaped coils C are disposed on a third side 23 and a fourth side 24 of the holder 20, corresponding to the magnetic units M. In this embodiment, each of the magnetic units M includes two magnets M1 and M2 with opposite polar directions.

As clearly shown in FIGS. 3 and 4, the frame F is affixed to an inner surface of the housing 10, wherein the housing 10 and the base 30 can form a case module with the frame F, the holder 20, the lens unit L, the coil C, the upper and lower springs S1 and S2, and the magnetic units M received therein. Here, the holder 20 is connected to the frame F and the base 30 via the upper and lower springs S1 and S2, respectively. As a result, the holder 20 and the optical unit received therein can be suspended within the housing 10 and movable relative to the housing and 10 the base 30 along an optical axis O of the optical unit L (parallel to the Z axis). A retainer R is provided at the bottom of the holder 20 to restrict the optical unit L within the holder 20 and prevent the optical unit L from being separated from the holder 20.

In this embodiment, at least a coil C and a magnetic unit M corresponding thereto can constitute a driving assembly, wherein the coil C is electrically connected to the conductive pins 31 via conductive wires (not shown), and the conductive pins 31 are electrically connected to an external circuit unit for driving the coil C. When the external circuit unit applies a current to the coil C, an electromagnetic unit force can be generated between the coil C and the magnetic unit M, thereby driving the holder 20, the optical unit L, and the coil C to move along the optical axis O (Z axis) and achieving auto-focus and/or auto-zoom control of the optical unit L.

Still referring to FIGS. 1-4, the optical unit L in this embodiment includes five lenses L1-L5 (FIGS. 3 and 4) which are affixed to an inner surface of the holder 20 by adhesion. Specifically, the lenses L4 and L5 located at the bottom of the optical unit L protrude from the holder 20 in a horizontal direction, and they are exposed to a first side 21 and a second side 22 of the holder 20. As shown in FIG. 4, the lens L4 has a first surface L41 and a second surface L42, wherein the first surface L41 protrudes from the holder 20 and is exposed to the first side 21, and the second surface L42 protrudes from the holder 20 and is exposed to the second side 22. Thus, the dimension of the holder 20 along the Y axis can be efficiently reduced to facilitate miniaturization of the optical mechanism. However, in some embodiments, the second surface L42 of the lens L4 may be covered by the second side 22 of the holder 20, and only the first surface L41 is exposed to the first side of the holder 20, so as to reduce the dimension of the holder 20 along the Y axis.

It should be noted that the first and second surfaces L41 and L42 are located on opposite sides of the lens L4 and respectively facing a first inner sidewall surface 11 or/and a second inner sidewall surface 12 of the housing 10, as shown in FIG. 4. In some embodiments, an anti-reflection layer or an ink layer may be formed on the first surface L41 and/or the second surface L42 of the lens L4 to prevent optical interference caused by light reflection. Similarly, an anti-reflection layer or an ink layer may also be formed on the first inner sidewall surface 11 or/and the second inner sidewall surface 12 of the housing 10 to prevent optical interference caused by light reflection.

Since the lenses L4 and L5 protrude from the holder 20 and are exposed to the first and second sides 21 and 22, they can directly contact the housing 10 or the base 30 to restrict the holder 20 and the lens unit L in a limit position when the optical mechanism is impacted by an external force. Therefore, there is no need to provide a positioning structure on the holder 20, so as to save the production cost and facilitate miniaturization of the optical mechanism.

FIGS. 5-8 show perspective diagrams from different viewing angles of the holder 20, the lens unit L, and the coils C of the optical mechanism in FIG. 1 after assembly. Referring to FIGS. 5-8, the lenses L4 and L5 are exposed to the first and second sides 21 and 22 of the holder 20, and two coils C are respectively disposed on a third side 23 and a fourth side 24 of the holder 20, respectively. Here, the third and fourth sides 23 and 23 are adjacent to the first and second sides 21 and 22.

In this embodiment, at least one position sensing element H may be disposed in the recess formed on the first side 21 or the second side 22 of the holder 20 for detecting the displacement of the holder 20 and the lens unit L relative to the housing 10. For example, the position sensing element H may be a magnet, and a Hall sensor may be disposed on the circuit board P corresponding to the magnet. As the Hall sensor can detect the magnetic field variation of the magnet due to their relative movement, the displacement of the holder 20 and the lens unit L relative to the housing 10 can be determined. Specifically, there are two position sensing elements H (magnets) disposed on the same side of the holder 20, as shown in FIGS. 5-8. The two position sensing elements H have opposite polar directions and are located adjacent to a magnetic sensor on the circuit board P. As a result, the magnetic field variation of the position sensing element H can be magnified and easy to detect by the magnetic sensor, thereby increasing sensitivity and accuracy of the displacement detection.

In some embodiments, the position sensing element H can also be a Hall sensor, giant magnetoresistance (GMR) sensor, or tunnel magnetoresistance (TMR) sensor, and a magnet can be disposed on the circuit board P corresponding to the position sensing element H. Thus, the displacement of the holder 20 and the lens unit L relative to the housing 10 can also be determined by the position sensing element H detecting the magnetic field variation of the magnet due to their relative movement.

Figure 9:
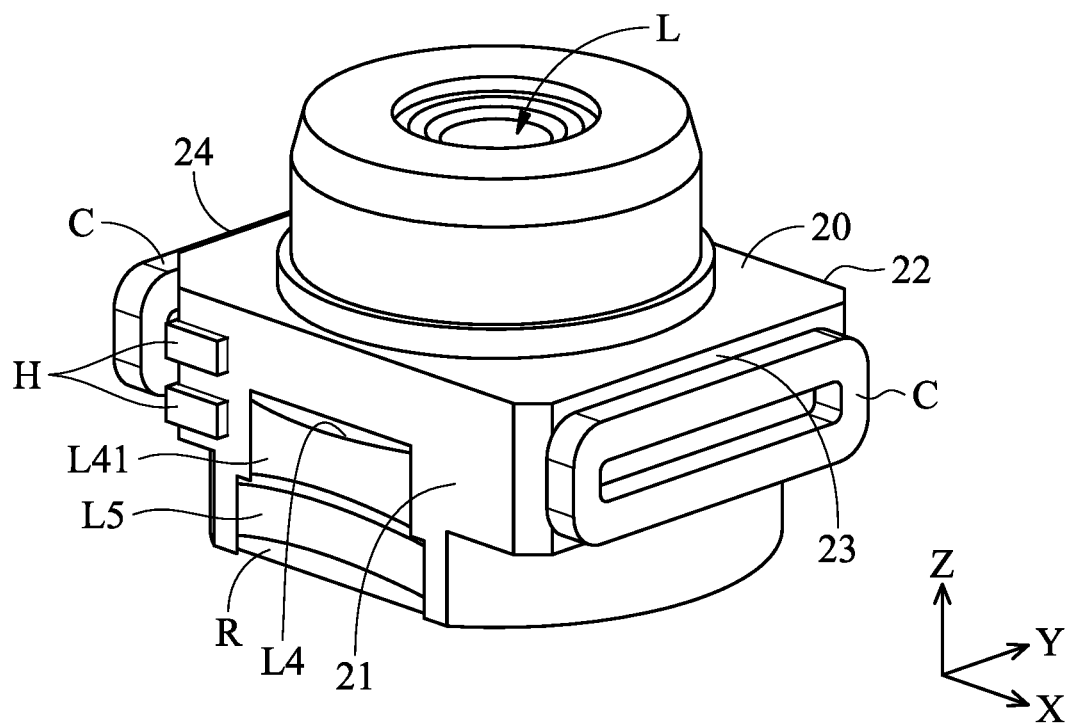
FIGS. 9 and 10 are perspective diagrams from different viewing angles showing a holder 20, a lens unit L, and two coils C of an optical mechanism after assembly, according to another embodiment of the invention.
Figure 10:
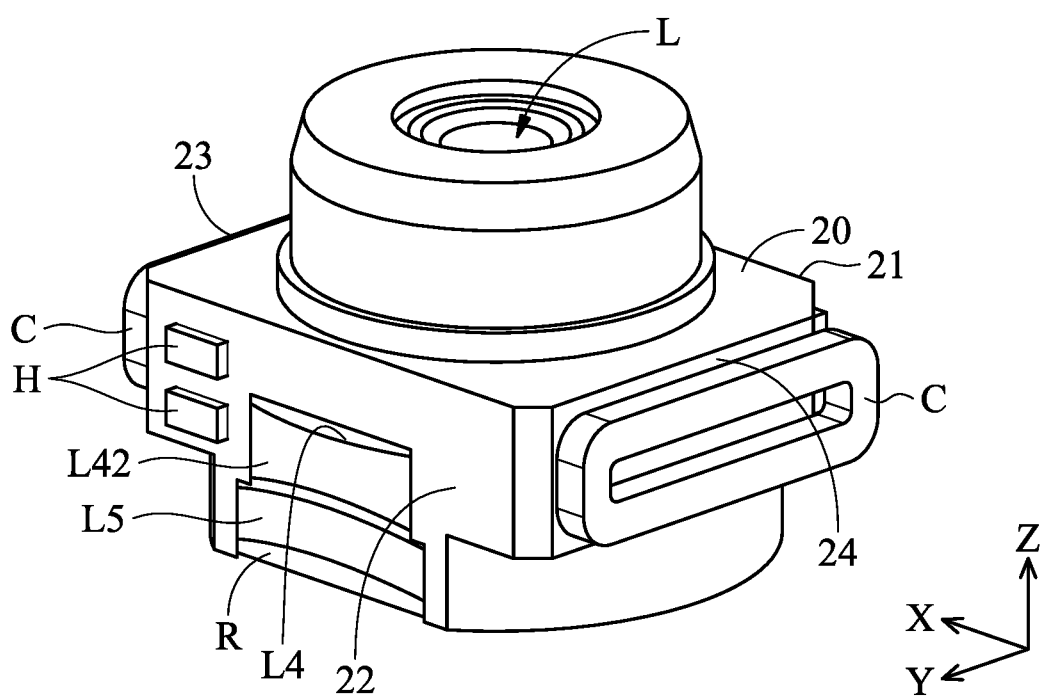

FIGS. 9 and 10 are perspective diagrams from different viewing angles showing a holder 20, a lens unit L, and two coils C after assembly, according to another embodiment of the invention. Referring to FIGS. 9 and 10, the lenses L4 and L5 have at least an edge forming a flat surface aligned with the first side 21 or the second side 22 of the holder 20. In an exemplary embodiment, the first surface L41 or the second surface L42 of the lens L4 may be a flat surface exposed to the first side 21 or the second side 22 of the holder 20, so that the dimension of the entire optical mechanism along the Y axis can be further reduced.

Figure 11:
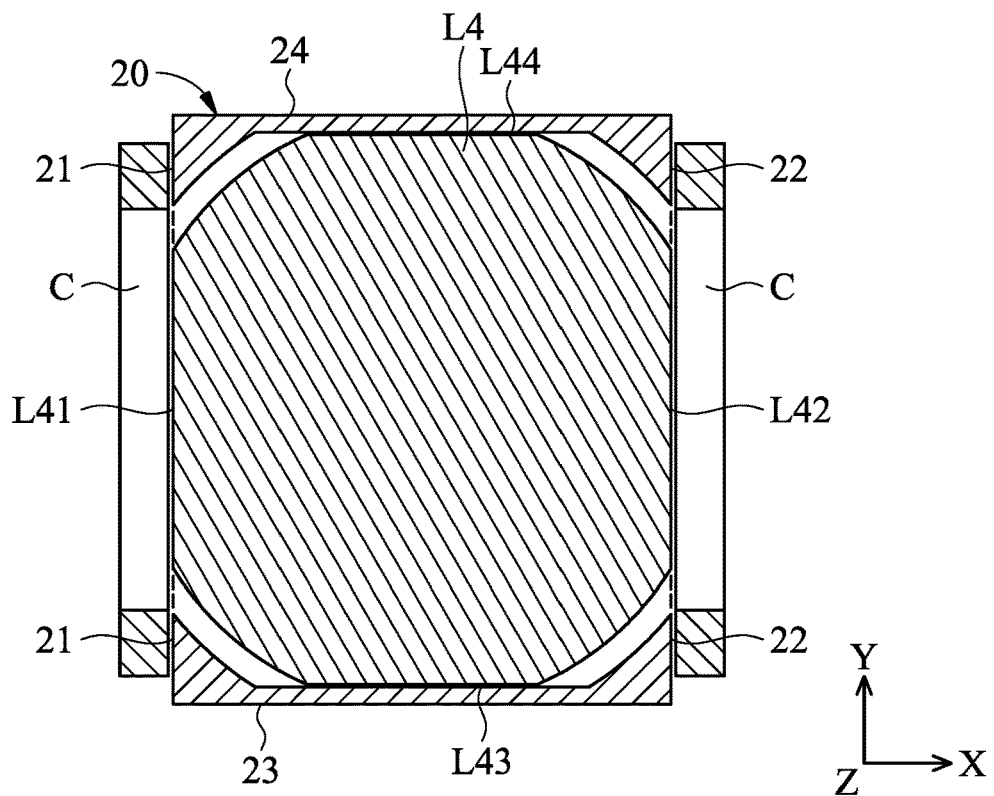
FIG. 11 shows a cross-sectional view of a holder 20, a lens L4, and two coils C of an optical mechanism after assembly, according to another embodiment of the invention.

FIG. 11 shows a cross-sectional view of a holder 20, a lens L4, and two coils C after assembly, according to another embodiment of the invention. Referring to FIG. 11, in addition to the first and second surfaces L41 and L42, the third and fourth surfaces L43 and L44 of the lens L4 are also flat surfaces. In this embodiment, only the first and second surfaces L41 and L42 are exposed to the first and second sides 21 and 22 of the holder 20 and face the first and second inner sidewall surfaces 11 and 12, and the third and fourth surfaces L43 and L44 are not exposed to the third and fourth sides 23 and 24 of the holder 20, wherein the area of the third surface L43 (or the fourth surface L44) is less than the first surface L41 (or the second surface L42).

It should be noted that the two coils C in this embodiment are respectively disposed on the first side 21 and the second side 22, corresponding to the magnetic units M affixed to the housing 10. Here, the coils C can be used to cover at least a part of the first and second surfaces L41 and L42, so that light leakage through the lateral sides of the lens L4 can be prevented. In some embodiments, the first side 21 and/or the second side 22 of the holder 20 may also be provided with one or several position sensing elements (e.g. the position sensing elements shown in FIGS. 5-8), so as to detect the displacement of the holder 20 and the lens unit L relative to the housing 10.

In some embodiments, an anti-reflection layer or an ink layer may be formed on the first surface L41 and/or the second surface L42 of the lens L4, or formed on the first inner sidewall surface 11 or/and the second inner sidewall surface 12 of the housing 10, to prevent optical interference caused by light reflection into the lens L4. However, the coils C may also be disposed on the third side 23 and/or the fourth side 24, wherein the coils C and the magnetic units M can generate an electromagnetic force driving the holder 20 and the lens unit L to move relative to the housing 10.

Figure 12:
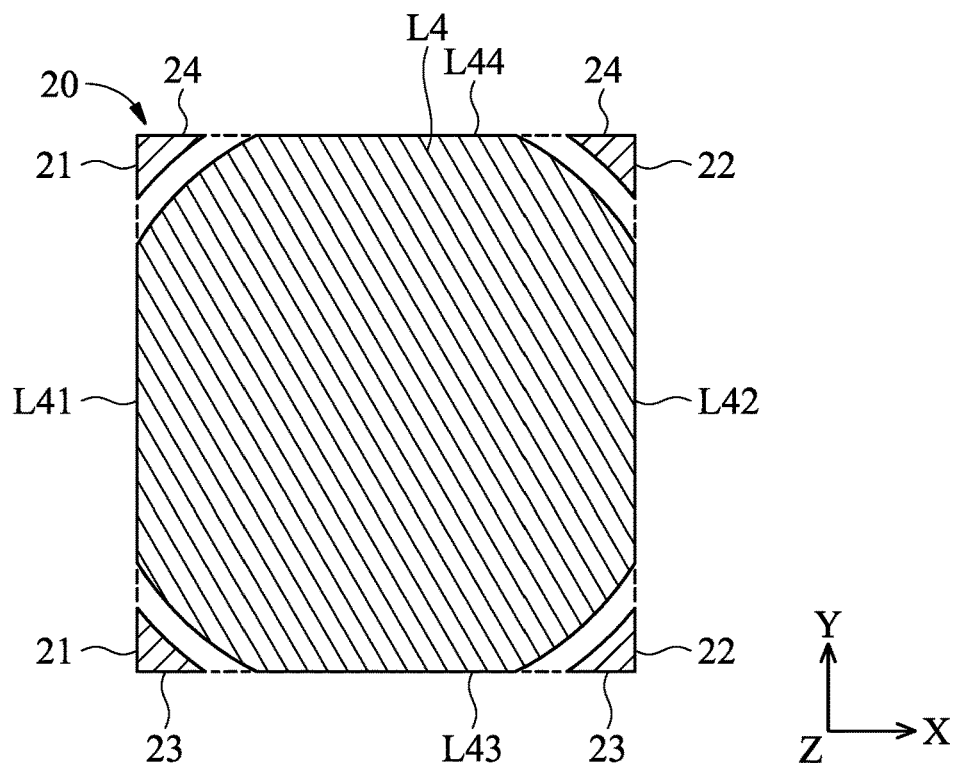
FIG. 12 shows a cross-sectional view of a holder 20 and a lens L4 of an optical mechanism after assembly, according to another embodiment of the invention.

FIG. 12 shows a cross-sectional view of a holder 20 and a lens L4 after assembly, according to another embodiment of the invention. In this embodiment, the first, second, third, and fourth surfaces L41-L44 are respectively exposed to the first, second, third, and fourth sides 21-24 of the holder 20, so as to reduce the dimensions of the optical mechanism along both of the X and Y axes.

Figure 13:
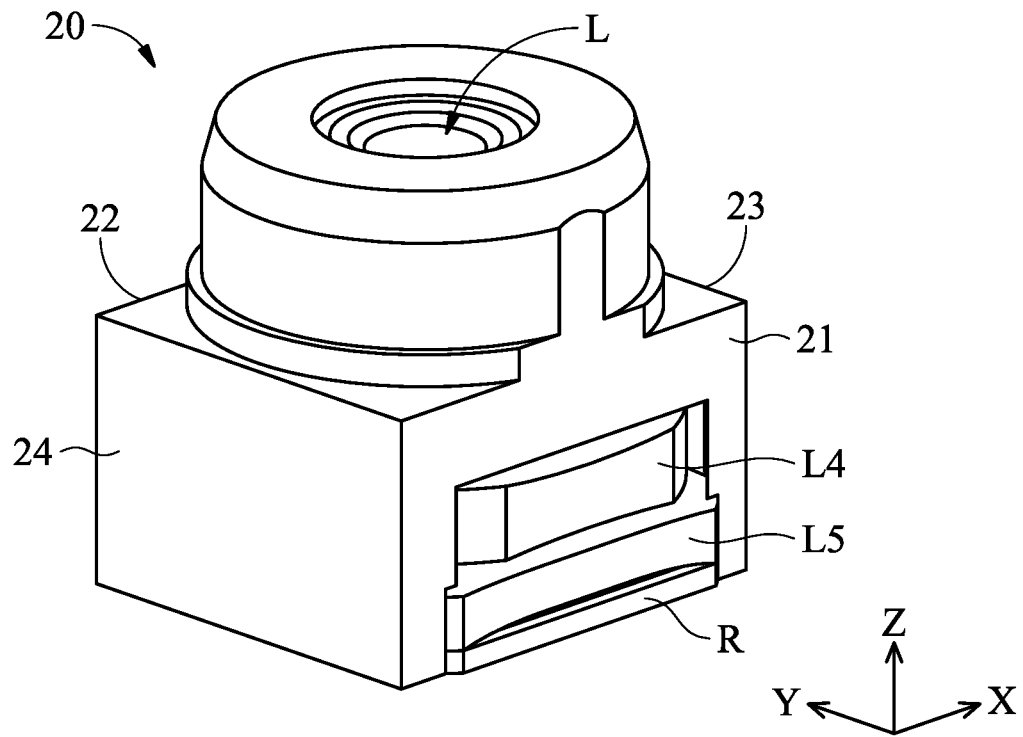
FIGS. 13-15 are perspective diagrams from different viewing angles showing a holder 20 and a lens unit L received in the holder 20 of an optical mechanism, according to another embodiment of the invention.
Figure 14:
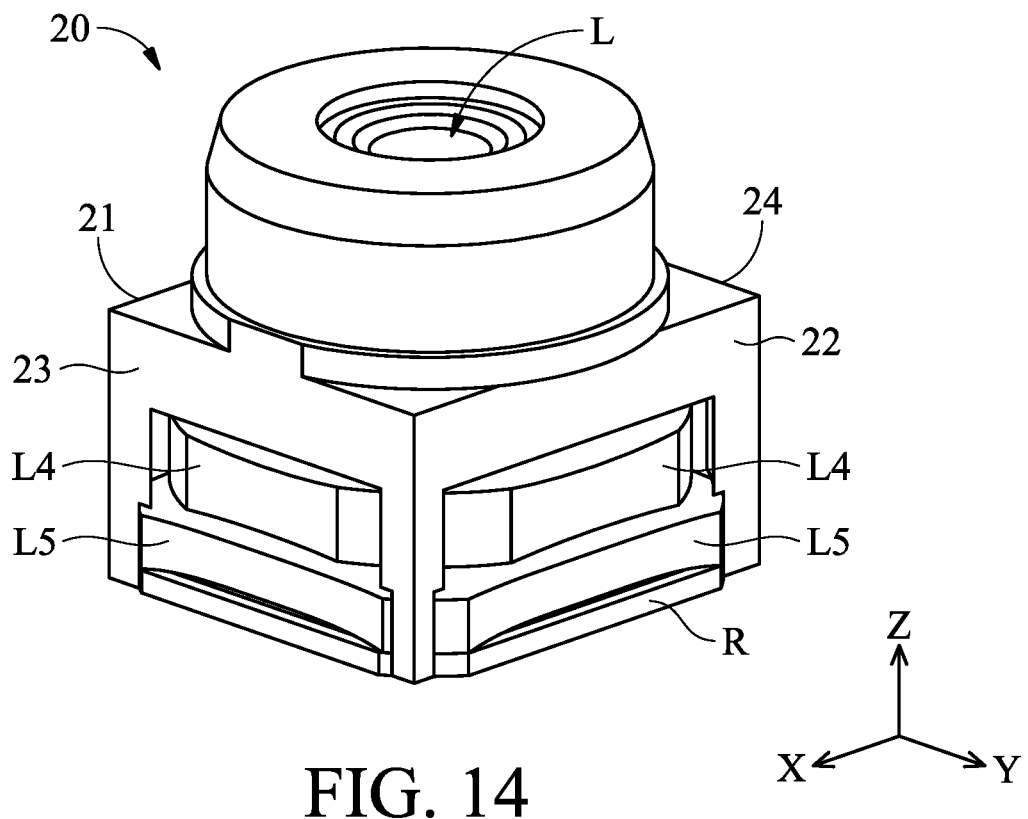
Figure 15:
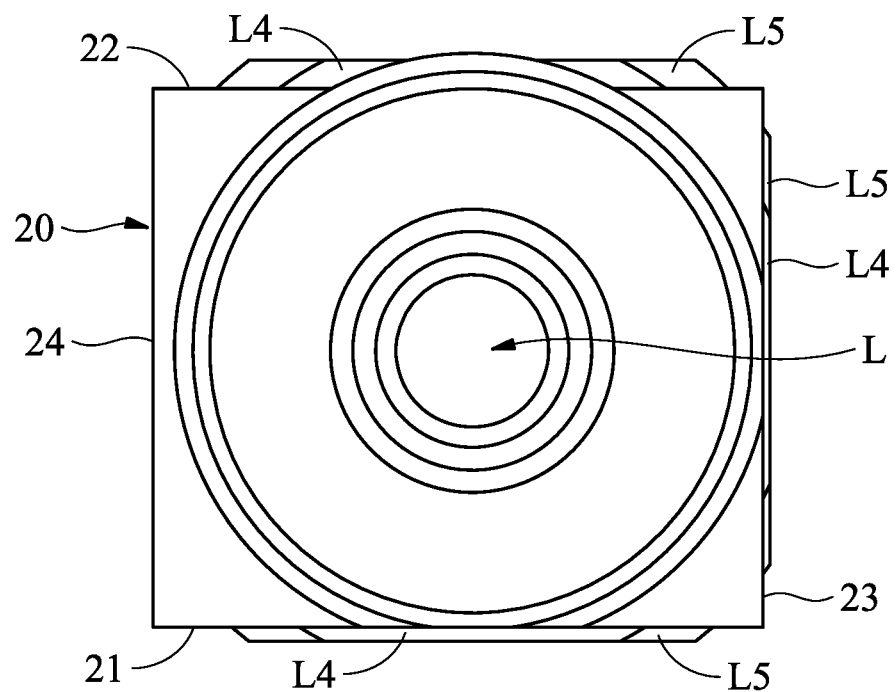

FIGS. 13-15 show perspective diagrams from different viewing angles of a holder 20 and a lens unit L received in the holder 20, according to another embodiment of the invention. In this embodiment, the lenses L4 and L5 are exposed to the first, second, and third sides 21, 22, and 23 of the holder 20, and the lenses L4 and L5 are covered by the fourth side 24 of the holder 20. As shown in FIG. 15, the lenses L4 and L5 at the bottom of the lens unit L protrude from the first, second, and third sides 21, 22, and 23 of the holder 20. However, the lenses L4 and L5 may also be aligned with the first, second, and third sides 21, 22, and 23 of the holder 20, so as to reduce the dimensions of the optical mechanism along the X and Y axes.

In summary, the optical mechanism of the invention may have at least a lens exposed to a side of the holder, or the lens may have an edge forming a flat surface, so that the dimension of the holder along the horizontal direction can be reduced to facilitate miniaturization of the optical mechanism.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical mechanism, comprising:
   an optical unit, featuring a light transmittable material allowing the light to pass through the optical unit and having a first surface and a second surface having plane structures that are mutually paralleled and constructing a first distance, wherein the first surface is not perpendicular to the optical axis,
   a base,
   a holder, connecting the optical unit and move relative to the base, wherein when viewed along the light axis, the holder has a polygonal profile, and the polygonal profile has a first side, a second side, a third side and a fourth side, wherein the third side and the fourth side are paralleled and constructed a second distance, wherein the first surface is parallel to the first side and the maximum second distance is longer than the maximum first distance,
   a driving assembly, driving the holder and the optical unit to move relative to the housing.

2. The optical mechanism as claimed in claim 1, wherein the optical mechanism further comprises a first axis and a second axis, wherein the first axis is perpendicular to the first surface.

3. The optical mechanism as claimed in claim 2, wherein the base further accommodates a circuit board exposing to the second surface, and the circuit board is at least partially covered by the base when viewed from a direction of the second axis.

4. The optical mechanism as claimed in claim 2, wherein an upper spring is attached to the holder and features a mirror symmetrical shape when viewed along the light axis, wherein the mirror plane of the aforementioned spring is constructed by the light axis and the first axis.

5. The optical mechanism as claimed in claim 3, wherein a sensing element is affixed to the circuit board and the sensing element does not overlap with the driving assembly when view along the second axis.

6. The optical mechanism as claimed in claim 3, wherein the optical unit is at least partially exposed to the circuit board.

7. The optical mechanism as claimed in claim 1, wherein the area of the third side is less than that of the first side.

8. The optical mechanism as claimed in claim 1, wherein the first surface and second surface are respectively exposed to the first side and second side.

9. The optical mechanism as claimed in claim 1, wherein the driving assembly is movably disposed on the third and the fourth side, and the driving assembly moves the optical unit along the light axis.

10. The optical mechanism as claimed in claim 1, wherein when viewed along a direction that is perpendicular to the light axis, the first surface, circuit board, optical unit and holder are mutually overlapped and paralleled.

11. The optical mechanism as claimed in claim 1, wherein a lower spring is attached to the holder, and when viewed along the light axis, the upper spring, driving assembly and lower spring are arranged in order and do not contact the first surface nor the second surface.

12. An optical mechanism, comprising:
    a housing;
    an optical unit, featuring a light transmittable material allowing the light to pass through the optical unit, having a first surface and a second surface which have plan plane structures that are mutually paralleled, wherein the first surface is not perpendicular to an optical axis,
    a base, attached to the housing;
    a holder, connecting the optical unit and move relative to the base, wherein when viewed along the light axis, the holder has a polygonal profile, and the polygonal profile has a first side, a second side, a third side and a fourth side, wherein the first surface is parallel with the first side, but perpendicular to the third side;
    a driving assembly, disposed in the housing, wherein the driving assembly is positioned on the third side and moves the optical unit relative to the base along the light axis.

13. The optical mechanism as claimed in claim 12, wherein the first surface is exposed to the housing and is opposite to the second side.

14. The optical mechanism as claimed in claim 12, wherein the optical mechanism further comprises a first axis that is perpendicular to the third surface, and the base accommodates a circuit board exposing to the second surface, and the circuit board is at least partially covered by the base when viewed from the first axis.

15. The optical mechanism as claimed in claim 14, wherein an upper spring is attached to the holder and features a mirror symmetrical shape when viewed along the light axis, wherein the mirror plane of the aforementioned spring is constructed by the light axis and the first axis.

16. The optical mechanism as claimed in claim 14, wherein a sensing element is affixed to the circuit board and the sensing element does not overlap with the driving assembly when view along the first axis.

17. The optical mechanism as claimed in claim 14, wherein the optical unit is at least partially exposed to the circuit board.

18. The optical mechanism as claimed in claim 12, wherein the area of the first side is less than that of the third side.

19. The optical mechanism as claimed in claim 12, wherein the first surface and second surface are respectively exposed to the first side and second side.

20. The optical mechanism as claimed in claim 12, wherein when viewed along a direction that is perpendicular to the light axis, the first surface, circuit board, optical unit and holder are mutually overlapped and paralleled.

* * * * *